Patented May 13, 1930

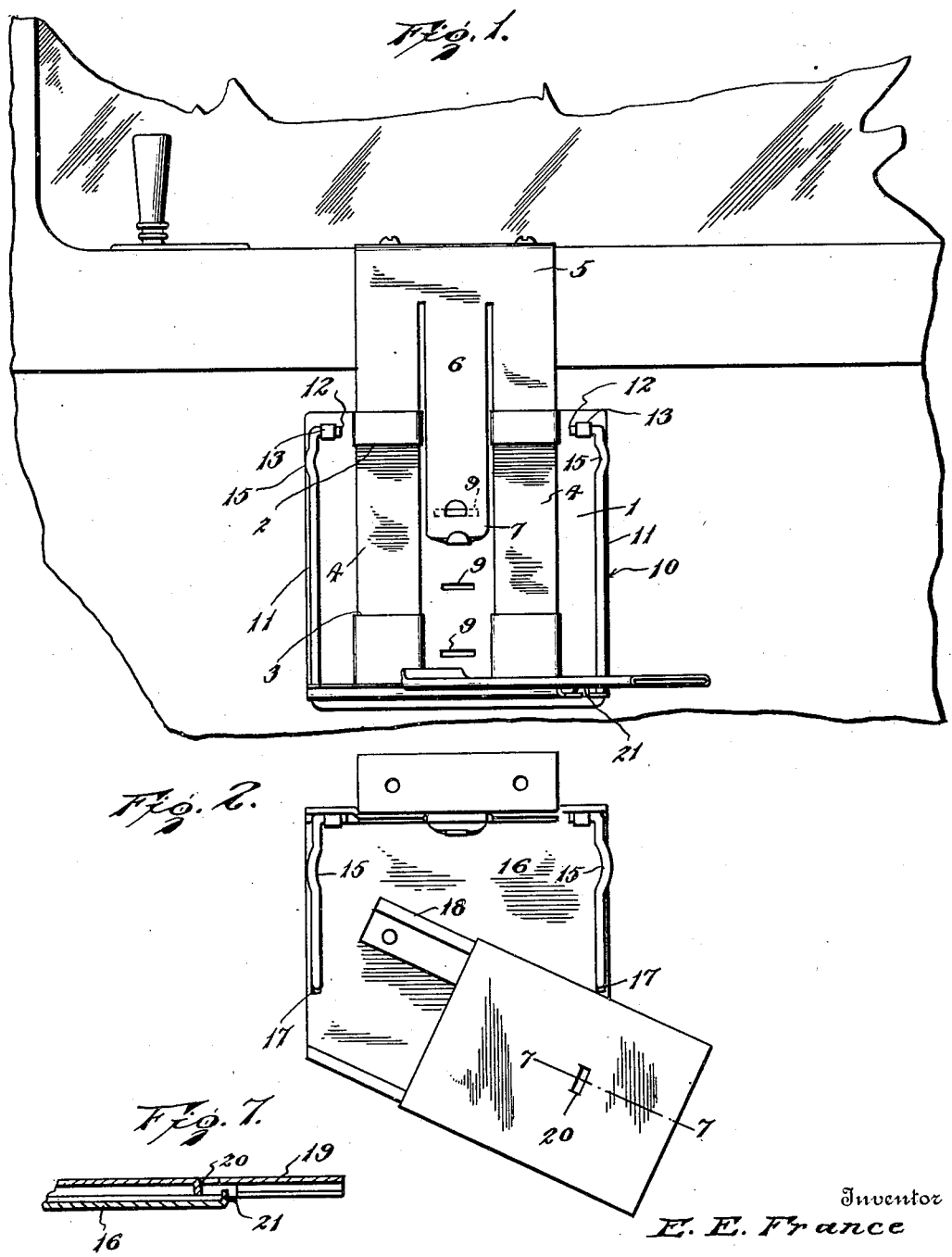

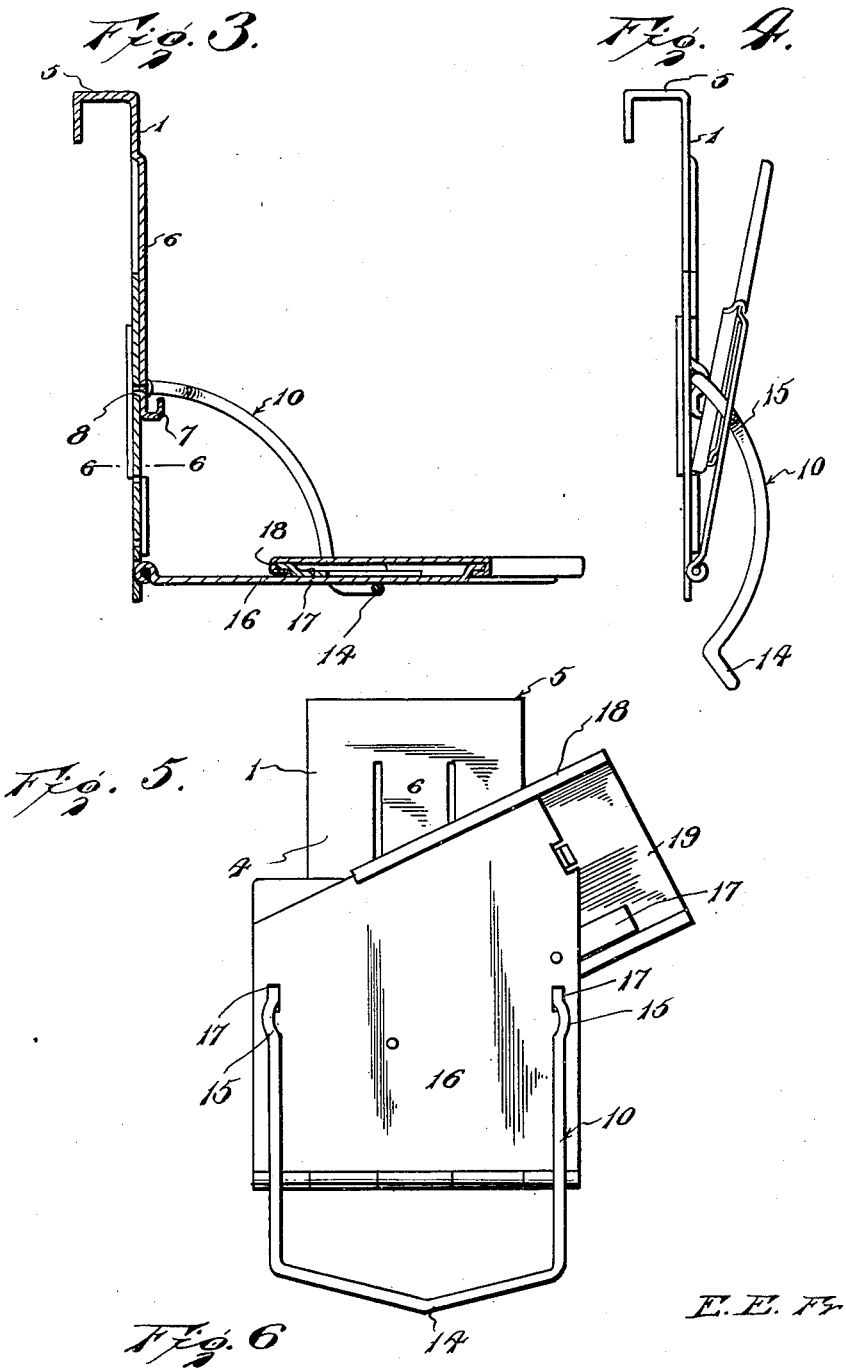

1,758,693

UNITED STATES PATENT OFFICE

EDWARD E. FRANCE, OF GREELEY, COLORADO

ARM REST FOR MOTOR VEHICLES

Application filed June 5, 1929. Serial No. 368,586.

The present invention is directed to improvements in arm rests for motor vehicles.

The primary object of the invention is to provide a device of this character which can be conveniently attached to the closed type of vehicle so that the driver of the car can conveniently rest the left arm while driving.

Another object of the invention is to provide a device of this character which is so constructed that it can be adjusted for use by persons of various heights.

Another object of the invention is to provide a device of this character wherein the driver's arm can be comfortably supported while driving without the necessity of supporting the arm in the window opening, thus permitting the driver to rest the arm when the window upon the driver's side of the car is closed.

With these and other objects in view, this invention resides in the novel features of construction, formation, combination and arrangement of parts to be hereinafter more fully described, claimed and illustrated in the accompanying drawings, in which:

Figure 1 is a view of the rest unfolded, taken from the interior of the car.

Figure 2 is a top plan view thereof.

Figure 3 is a sectional view taken through the arm rest unfolded.

Figure 4 is a side view of the arm rest when folded.

Figure 5 is a top plan view of the rest when folded.

Figure 6 is a sectional view on the line 6—6 of Figure 3.

Figure 7 is a sectional view on the line 7—7 of Figure 2.

Referring to the drawings, 1 designates a sheet metal plate having formed therein vertically spaced slots 2 and 3 and in which slide the guide arms 4, said arms being connected at their upper ends to a hook member 5 adapted to engage over the lower rail of the vehicle window frame. A tongue 6 is carried by the member 5 and has a finger piece 7 at its lower end and a lug 8 struck therefrom which is adapted to selectively engage the slots 9 formed in the plate 1 in order that the rest can be supported in various positions of vertical adjustment. A supporting bail 10 is employed and has its side arms 11 terminating in extensions 12 which are adapted to pivotally engage the bearings 13 carried by the upper corners of the plate 1, said bail having its bight portion 14 disposed in angular relation with respect to the side arms thereof. The arms 11 of the bail 10 are provided near their upper ends with offsets 15, the purpose of which will later appear.

Hingedly connected to the lower edge of the plate 1 is a plate 16, said plate having openings or slots 17 formed therein for slidably engaging the side arms of the yoke 10. Mounted upon the plate 16 and disposed diagonally thereon is a guide strip 18 which is adapted to coact with the inturned flange 18' of the arm supporting plate 19, said plate having a tongue 20 struck therefrom which is adapted to engage the stop 21 carried by the plate 16 to limit the forward sliding movement of the plate 19. The plate 19 is preferably covered or upholstered in any suitable manner so that the arm can be comfortably supported thereon when the device is in its operative position.

It will be obvious that when the plate 16 is in a horizontal position the same will be held thus due to the fact that the bight portion 14 of the bail is horizontally disposed, and owing to the fact that the plate 19 can be adjusted forwardly and backwardly it will be apparent that the same can be adjusted to suit the comfort of the driver. When it is not desired to use the rest, the plate 16 is swung upwardly and owing to the presence of the slots 17 the plate is permitted to readily fold upwardly and as it assumes a substantially vertical position the slots will have passed the offsets 15 and owing to the fact that the bail is formed from resilient wire the offsets will move outwardly, thus preventing the plate 16 from accidentally swinging downwardly. However, when it is desired to lower the plate 16, it is only necessary to grasp the same and pull downwardly thereon, whereupon the slots 17 will slide past the offsets 15 until the plate again rests upon the bight portion 14 of the yoke and at which time the plate is in a horizontal position in order that the plate 19 can be adjusted to suit the comfort of the user.

While I have described and illustrated a hook member which is adapted to be engaged over the lower sill of the window, it will, of course, be understood that other means may be provided for securing the arm rest to the vehicle.

From the foregoing, it is thought that the operation and many advantages of the herein described invention will be apparent to those skilled in the art without further description and it will be understood that various changes in the size, shape, proportion, materials and minor details of construction may be resorted to without departing from the spirit or sacrificing any of the advantages of the invention.

What is claimed is:

1. An arm rest comprising a plate, a second plate hingedly connected thereto, and provided with side openings a bail pivotally connected with the first named plate and slidable through the side openings of the second named plate, said bail having offsets in its arms, for engagement with the second named plate to hold the same in its folded position.

2. An arm rest comprising a vertically disposed supporting plate, a second plate hingedly connected thereto and provided with side openings, an arm engaging plate slidably connected with the second named plate, a bail having its arms pivotally connected to the supporting plate and slidable through the side openings of the second named plate, said bail having its bight portion disposed in angular relation with respect to its side arms for engagement with the second named plate to hold the same in a horizontal position, and means carried by the arms of the bail for holding the second named plate in a substantially vertical position.

3. An arm rest of the class described comprising a plate, means for adjustably securing the plate to a support, a second plate hingedly connected to said first named plate and provided with side openings and having an arm supporting plate slidably mounted thereon, a bail pivotally connected with the first named plate and slidable through the side openings of the second named plate and having its bight portion disposed in angular relation with respect to its side arms for engaging the second named plate to hold the same in a horizontal position, and offsets carried by the side arms of the bail for engagement with the second named plate to hold the same in its folded position.

4. An arm rest comprising an adjustably supported vertically disposed plate, a second plate hingedly connected to the lower end thereof and having slots formed therein, a bail having its side arms pivotally connected with the supporting plate and slidable through the slots of the second named plate, said second named plate having a guide strip carried thereby, an arm supporting plate slidably engaged with the strip, means carried by the arm supporting plate and second named plate to limit the sliding movement thereof, and means carried by the side arms of the bail to prevent accidental unfolding of the second named plate.

5. An arm rest comprising a vertically disposed supporting plate, means for adjustably securing the plate to a vehicle, said plate having a bail pivotally connected thereto, a second named plate hingedly connected to the supporting plate and having slots formed therein, said second named plate having a guide strip fixed diagonally thereon, an arm supporting plate slidably interlocked with the guide strip and disposed diagonally with respect to the second named plate, means for limiting the sliding movement of the arm supporting plate, said second named plate having slots formed therein, said bail having offsets formed in its arms adapted to prevent accidental movement of the second named plate from a vertical position to a horizontal position.

In testimony whereof I affix my signature.

EDWARD E. FRANCE. [L. S.]